May 13, 1969 M. T. WADDELL ET AL Re. 26,579

HEATER

Original Filed Nov. 20, 1964

INVENTORS.
MATHIS T. WADDELL,
JOHN M. POWERS,
RHODERICK K. SAUNDERS,
BY Kurt S. Myers
ATTORNEY.

United States Patent Office

Re. 26,579
Reissued May 13, 1969

26,579
HEATER

Mathis T. Waddell, John M. Powers, and Rhoderick K. Saunders, Baytown, Tex., assignors, by mesne assignments, to Esso Research and Engineering Company, Elizabeth, N.J., a corporation of Delaware Original No. 3,292,608, dated Dec. 20, 1966, Ser. No. 536,526, Feb. 25, 1966, which is a continuation of application Ser. No. 412,720, Nov. 20, 1964. Application for reissue Mar. 18, 1968, Ser. No. 717,057
Int. Cl. A01g *13/06;* F23q *25/00;* F23d *3/16*
U.S. Cl. 126—59.5 12 Claims

Matter enclosed in heavy brackets [ ] appears in the original patent but forms no part of this reissue specification; matter printed in italics indicates the additions made by reissue.

*ABSTRACT OF THE DISCLOSURE*

*A heater, useful in orchards, which comprises a pan with a wicking material extending between two sides of the pan and resting on the pan bottom and burns a wax having a fire point of about 425° to 650° F. A cover on the pan opens to expose the wicking material so that controlled heating may be accomplished for periods in excess of ten hours.*

This application is a continuation of Serial No. 412,720, filed November 20, 1964, entitled "Heater."

The present invention is directed to a heater device designed primarily as a convective heater for heating orchard trees. More particularly, the invention is directed to a solid fueled heater which burns at an even rate.

The present invention may be briefly described as a heater which comprises a metal pan having a bottom and sides between about 1 and 4 inches high; a noncombustible, wax-impregnated wicking material extending between two of the sides and resting on the bottom of the pan; the wicking material being not less than one fifth of the length of the sides between which the material is extended and substantially as high as the sides of the pan; a wax having a melting point above about 135° F. and a fire point between about 425° to about 650° F. which substantially fills the pan on both sides of the wicking material; and a divided metal cover on the pan which may be adjusted to expose the desired burning surface of the wicking material.

Heretofore, devices have been used in an attempt to protect citrus trees which included such devices as liquid fueled smudge pots and large stoves. Such devices required careful handling of the fuel and caused uneven distribution of the heat throughout the orchard. The heater devices of the present invention are designed for heating the space under each tree canopy by placing the device on the ground under the individual trees in an orchard. By burning the heater devices of the present invention, the canopy contains the heat developed by the burning of the heater device and protects the major wood of the citrus trees from freezing under conditions which have caused great losses heretofore.

It is an object of the present invention to provide a heater device which will burn evenly with little attention.

It is a further object to provide a solid fueled heater of convenient size for handling and storage, which is easily lit and which is safe to handle.

Still further, it is an object of the present invention to provide a heater device which is reliable and has the ability to protect citrus trees from freezing.

These and other objects and advantages of the present invention will appear more clearly from the following description setting forth the invention details.

The heater device of the present invention comprises a rectangular pan filled with a wax, a center wicking material of porous, non-combustible material resting on the bottom of the pan and impregnated with the wax and having an exposed top area of a size to control burning at the desired rate, and a divided metal cover for the pan which may be adjusted to expose the burning surface.

The pan of the heater of the present invention may be made of any material which will not burn, but is preferably a metal or metal-coated pan. Suitable pans to be used in the present invention must be at least one inch deep but should not exceed about 4 inches in depth to provide a relatively shallow fuel reservoir. The pan must be of a size or have dimensions such as to provide sufficient fuel to have extended periods of burning, say 10 hours, at a relatively constant rate to be useful for heating orchard trees. A particularly suitable pan is an aluminum pan having the approximate dimensions of 17 x 12 x 2½ inches.

The heater of the present invention has a wax-impregnated, noncombustible wicking material extending across the pan and in the center thereof, which rests on the bottom of the pan. It is important in the present invention that the wick rest on the bottom of the pan so that it will not sink as the fuel melts. The wicking material, in conjunction with the shallowness of the fuel reservoir, maintains a relatively constant fuel level relative to the top of the wicking material, and permits burning to proceed at an even rate. Furthermore, the wicking material provides easier lighting since only a thin layer of wax need be heated to the fire point before fire is sustained. The essential function of the wickng material is to enable a more uniform flame height to be maintained even under drafty conditions such that it reduces the tendency of the flame to blow out or to flare up. The wicking material has a height which is substantially that of the pan, being somewhat less in that the pan is not completely filled with the wax fuel. The wicking material extends between two of the sides of the pan, the two longer sides if the pan is not square, and is at least one fifth of the length of the sides between which the material is extended. The overall dimensions of the wicking material depend upon the desired burning area which will determine the amount of heat and the rate at which the heater will burn as well as on the particular wax which is burned in the device. It has been found that, in a pan having the dimensions of 17 x 12 x 2½, a wicking material having the dimensions of about 12 x 4 to 6 x 2 to 2¼ inches produces an effective heater. The wicking material is made in a suitable size of asbestos, asbestos fiber, rock wool, or rock wool batt or other noncombustible porous material.

The fuel reservoir on both sides of the wicking material is filled with a wax. Likewise, the center wicking material is impregnated with the wax. The term "wax" as used herein is defined to include both petroleum waxes and petrolatums. These materials are predominately saturated hydrocarbons obtained from crude oil, i.e., heavy distillates or residual materials. The wax used in the present invention has a melting point above about 135° F. and a fire point between about 425° F. to about 650° F. Preferred waxes have a melting point between 150° to 170° F. and a fire point between 525° to 650° F. It has been found that fuels that are too light cannot be fully compensated as to burning rate by reducing the burning area, but burn irregularly and may blow out. Waxes that are too heavy also cannot be compensated as to the desired burning rate since the heavier waxes tend to sludge and thus reduce the burning rate with time of burning. While liquid fuels as well as the solid waxes having the same ASTM fire point will burn equally well in the heater of the present invention, the solid waxes are used in order to reduce spilling during handling and to prevent the access of moisture to the fuel whereby foaming in operation is encountered.

The heater device of the present invention has a divided metal cover on the pan which may be adjusted to expose the desired burning surface of the wicking material. Further, the divided metal cover serves as a complete cover to the heater device when shipped or during storage. When the heater is to be used, such as placing the heater on the ground beneath a citrus tree, the divided cover is opened to expose only the wicking material. This insures that the desired burning surface is exposed and that the proper burning rate will be accomplished throughout the entire burning of the wax in the heater. Likewise, the divided cover enables the certain control of the burning rate during the operation of the heater if this is desired.

The present invention will be further illustrated by reference to the drawings in which.

Figure 1:
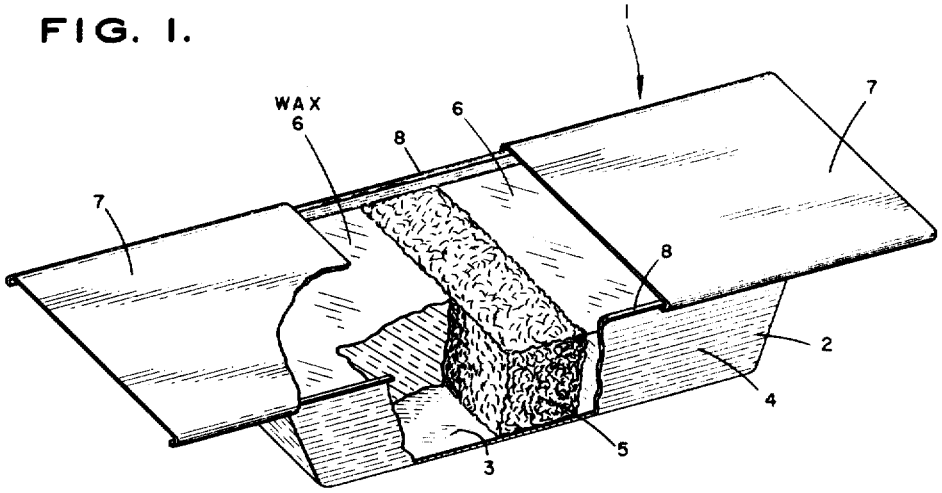
FIG. 1 is an isometric view of an embodiment of a heater of the present invention with parts cut away.

In FIG. 1, the specific embodiment of a heater 1 of the present invention is shown. The heater 1 comprises a pan 2 having a bottom 3 and sides 4. A preferred pan is made from aluminum and has the following dimensions: a length of about 17 inches across the top and 15½ inches along the bottom; has a width of about 12 inches across the top and 10½ inches across the bottom and a depth of about 2½ inches. Between the two sides 4 extends a wicking material 5 which rests on the bottom 3 of the pan. The wicking material will have a width of about 4 to 6 inches, depending upon the wax to be burned in the heater, and is fabricated from loose rock wool insulation material or a thick batt of rock wool. The height of the wicking material is between 2 to 2¼ inches in a heater having a pan of about 2½ inches in height. Thus, the height of the wicking material is substantially that of the height of the pan. The fuel reservoir on either side of the wicking material 5 is filled with a wax having a melting point preferably above 150° F. and is thus assured to be a solid at storage temperatures. The wax 6 also is used to impregnate the wicking material although, if desired, a different wax may be used to impregnate the wicking material to aid in lighting the heater. The pan 2 has a divided metal cover 7 which in the closed position completely covers the pan 2. To operate the heater of the present invention, the divided covers are opened by sliding them along the top edge 8 which is fitted to hold the covers and allow them to be slid. The divided cover 7 is open so as to expose the wicking material and may be lit either by a match or some other device to quickly light the heater. The cover 7 on the pan may be adjusted to expose the desired burning surface of the wicking material to control the desired burning rate.

When petrolatums are used as the wax fuel in the ureferred metal pan having the dimensions 17 x 12 x 2½ inches, the following serves as illustrative of the heaters of the present invention:

Wax:

(1) Petrolatum having an SBA at 0° oil content of 30% or less,[1] a melting point above 150° F., and an ASTM fire point above 600° F.[2]

(2) Petrolatum having an SBA at 0° oil content of 25% or less,[1] a melting point above 150° F., and an ASTM fire point of 525–550° F.[2]

Wicking Material:

(1) 200 grams of loose rock wool insulation formed across the width of the pan, 6 inches wide and 2¼ inches deep.

(2) 150 grams of loose rock wool insulation formed across the width of the pan, 4 inches wide and 2¼ inches deep.

The heaters were constructed by pouring the hot petrolatum in the pans until about 11 pounds had been added. The divided covers are adjusted to expose 6½ inches when wick 1 is used and 4½ inches when wick 2 is used.

Figure 2:
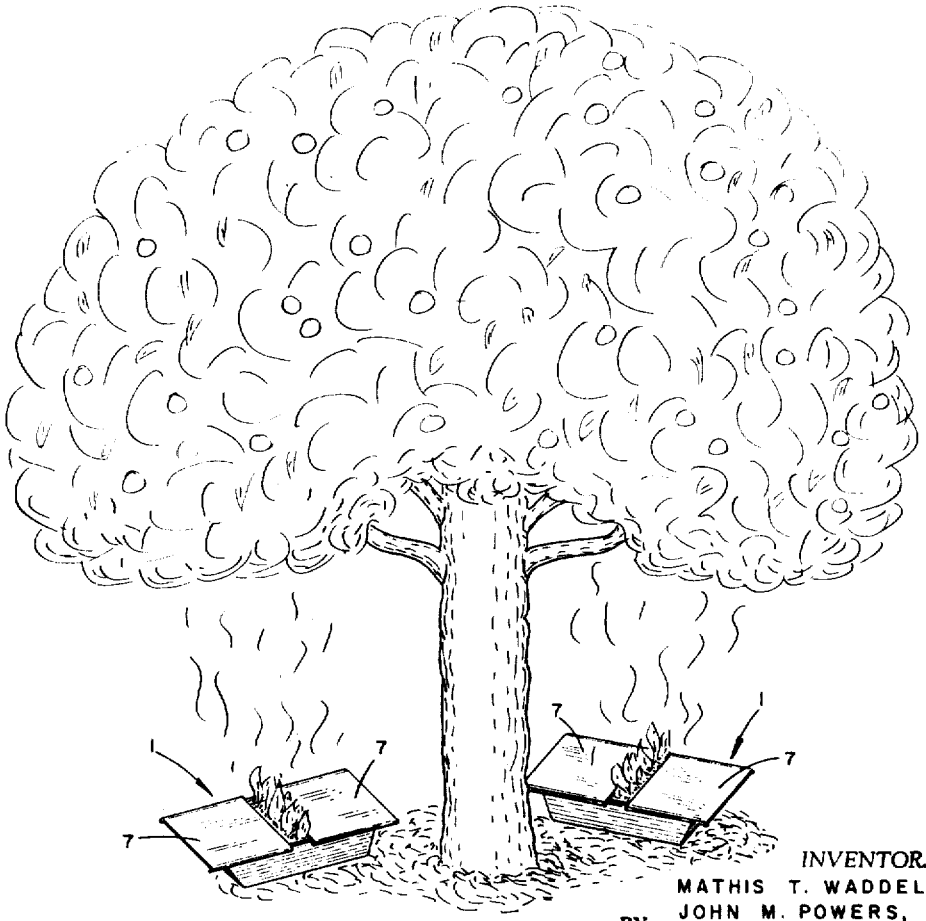
FIG. 2 is a perspective view of a heater while burning.

In FIG. 2 there is shown a heater 1 of the present invention while burning to illustrate the uniform flame height of the heaters of the present invention. The heater 1 provides a flame which will burn through the life of the heater at a constant height so as not to pulse or suddenly flare up depending upon the air flow in a manner such, when the heater is under low limbs, that any destruction to the tree will occur. The heaters 1 of the present invention produce radiant and convective heat to the individual tree and burn for a period of time sufficient to last overnight.

To further illustrate specific heaters of the present invention, the following Table I lists various heaters made in accordance with the present invention.

TABLE I

| Metal Pan Size | Wicking Material | | Wax | |
|---|---|---|---|---|
| | Amount and Material | BSA [1] | Type | Weight |
| 492 cu. in. | 120 g. loose rock wool | 22 | 450 Neut. Pet. | 11.2 |
| 492 cu. in. | 125 g. rock wool batt | 72 | Bright Stock Pet. | 10.4 |
| 492 cu. in. | 125 g. loose rock wool | 44 | C Pet. | 12.3 |
| 320 cu. in. | 35 g. loose rock wool | 33 | C Pet. | 8.6 |
| 320 cu. in. | 30 g. rock wool batt | 36 | C Pet. | 12.5 |
| 492 cu. in. | 120 g. loose rock wool | 44 | C Pet. | 8.9 |
| 320 cu. in. | 100 g. loose rock wool | 39 | C Pet. | 6.3 |
| 492 cu. in. | Loose rock wool | 44 | 16% 450 Neut., 84% C Pet. | 11.4 |
| 492 cu. in. | 120 g. loose rock wool | 44 | Cy. Oil Pet. | 6.2 |
| | 50 g. rock wool batt | | Mik. #1650 | 2.8 |

[1] Burning Square Area.
Neut.—Neutral, Pet.—Petrolatum, KMik.—Mikrovan.

All of the heaters in the foregoing Table I were rated as effective heaters according to the present invention. Waxes which may be used in the heaters are commercially

[1] Standard Inspection Laboratory Analytical Methods Specification Method of Test for Oil Content of Petrolatum 500.15D.
[2] ASTM D-92-57.

available and their characteristics as to melting point, flash point and fire point are set forth in Table II below.

TABLE II

| Wax | M.P., ° F. | Flash Point, ° F. | Fire Point, ° F. |
|---|---|---|---|
| 450 Netural Petrolatum | [1] 151 | 475 | [3] 525 |
| Bright Stock Petrolatum | [1] 169 | [2] 550–580 | [3] 620 |
| "C" Petrolatum | [1] 169.5 | [2] 610 | [3] 650 |
| Cylinder Oil Petrolatum | [1] 167 | [2] 550–580 | [3] 620 |
| Mikrovan 1650 | 160–170 | 540 | 590 |
| 8059 Petrolatum | [1] 135–150 | 520 | [3] 570 |

[1] ASTM Petroatum M.P. (melting point).
[2] Flux Kerosene Free.
[3] Estimated.

When petrolatums are used as the fuel in the heaters of the present invention, the amount of oil in the petrolatum should be less than 40% and preferably less than 30% or the presence of the oil will tend to soften the mixture and give erratic burning characteristics to the fuel.

The nature and objects of the present invention have been completely described and illustrated and the best mode thereof contemplated set forth. Other specific modes may be made, and accordingly, the invention should be considered in view of the following claims. What we wish to claim as new and useful and secure by Letters Patent is:

1. A heater which comprises:
a pan having a bottom and sides, said sides being between 1 and 4 inches high;
a non-combustible, wax-impregnated wicking material extending between two of said sides and resting on said bottom; said wicking material being not less than one-fifth of the length of said sides between which said material is extended and substantially as high as the sides of said pan;
a wax having a melting point above 135° F. and a fire point of about 425° to 650° F. placed on both sides of said wicking material to fill said pan; and
a divided movable cover on said pan.

2. A heater which comprises:
a pan having a bottom and sides, said sides being between 1 and 4 inches high;
a non-combustible, wax-impregnated wicking material extending between two of said sides and resting on said bottom; said wicking material being not less than one-fifth of the length of said sides between which said material is extended and substantially as high as the sides of said pan;
a wax having a melting point between 150° to 170° F. and a fire point between 525° to 650° F. placed on both sides of said wicking material to fill said pan; and
a divided movable cover on said pan.

3. A heater which comprises:
a metal pan having a bottom and sides, said pan having the approximate dimensions of 17 x 12 x 2½ inches;
a noncombustible, wax-impregnated wicking material extending between the two 17-inch sides and resting on said bottom, said wicking material being not less than one-fifth of the length of said 17-inch sides and substantially as high as the sides of said pan;
a wax having a melting point between about 150° to 170° F. and a fire point between 525° to 650° F. which fills said pan; and
a divided movable cover on said pan.

4. A heater according to claim 3 wherein said wicking material is made of a loose rock wool insulation and being about 6 inches wide and 2¼ inches deep; and said wax is a petrolatum having a melting point about 150° F. and a fire point above 600° F.

5. A heater according to claim 3 wherein said wicking material is made of a loose rock wool insulation and being about 4 inches wide and 2¼ inches deep; and said wax is a petrolatum having a melting point above 150° F. and a fire point between 525° to 550° F.

6. A heater according to claim 3 wherein said wicking material is made of rock wool batt insulation and being about 6 inches wide and 2¼ inches deep; and said wax is a petrolatum having a melting point about 150° F. and a fire point about 600° F.

7. A heater according to claim 3 wherein said wicking material is made of rock wool batt insulation and being about 4 inches wide and 2¼ inches deep; and said wax is a petrolatum having a melting point above 150° F. and a fire point between 525° to 550° F.

8. A heater element for a pan heater having a bottom and sides, said sides being between 1 and 4 inches high which comprises:
a noncombustible, wax-impregnated wicking material in the center of the element, said wicking material extending between two sides and from the top to the bottom of the element and being not less than one-fifth the length of the element in the remaining dimension; and
a wax on both sides of said wicking material having a melting point above 135° F. and a fire point of about 435° to 650° F.

9. A heater element according to claim 8 wherein said element has the approximate dimensions of 17 x 12 x 2 to 2¼ inches and said wicking material has the approximate dimensions of 12 x 4 to 6 x 2 to 2¼ inches.

*10. A heater which comprises:*
*a pan having a bottom and sides, said sides being between 1 and 4 inches high;*
*a non-combustible, wax-impregnated wicking material extending between two of said sides and resting on said bottom; said wicking material being not less than one-fifth of the length of said sides between which said material is extended and substantially as high as the sides of said pan;*
*a wax having a melting point above 135° F. and a fire point of about 425° to 650° F. which fills said pan; and*
*a cover on said pan.*

*11. A heater which comprises:*
*a pan having a bottom and sides, said sides being between 1 and 4 inches high;*
*a non-combustible, wax-impregnated wicking material extending between two of said sides and resting on said bottom; said wicking material being not less than one-fifth of the length of said sides between which said material is extended and substantially as high as the sides of said pan;*
*a wax having a melting point between 150° to 170° F. and a fire point between 525° to 650° which fills said pan; and*
*a cover on said pan.*

*12. A heater element for a pan heater having a bottom and sides, said sides being between 1 and 4 inches high which comprises:*
*a non-combustible, wax-impregnated wicking material in the element, said wicking material extending between two sides and from the top to the bottom of the element and being not less than one-fifth the length of the element in the remaining dimension; and*
*a wax surrounding said wicking material having a melting point above 135° F. and a fire point of about 435° to 650° F.*

(References on following page)

References Cited

The following references, cited by the Examiner, are of record in the patented file of this patent or the original patent.

UNITED STATES PATENTS

| | | | |
|---|---|---|---|
| 940,965 | 11/1909 | Hamilton | 431—331 |
| 970,044 | 9/1910 | Hamilton | 431—331 |

| | | | |
|---|---|---|---|
| 2,168,698 | 8/1939 | Bunt et al. | 431—291 |

FOREIGN PATENTS

| | | |
|---|---|---|
| 205,888 | 10/1923 | Great Britain. |

CHARLES J. MYHRE, *Primary Examiner.*

U.S. Cl. X.R.

431—146, 291